United States Patent Office 3,153,000
Patented Oct. 13, 1964

3,153,000
ORDERED ORGANO-SILICON-CHELATED TITANIUM OXIDE COPOLYMERS AND METHODS OF MAKING SAME
Hideyo H. Takimoto and John B. Rust, Los Angeles, Calif., assignors to Hughes Aircraft Company, Culver City, Calif., a corporation of Delaware
No Drawing. Filed Sept. 28, 1960, Ser. No. 58,911
11 Claims. (Cl. 260—2)

The present invention relates to silicon-titanium oxide copolymers of outstanding thermal stability and to the process of making same. More specifically this invention relates to silicon-titanium oxide copolymers containing regularly ordered repeating units along the polymer chain in which alkyl or aryl substituents are attached to silicon and chelating groups are attached to titanium.

Copolymers of silicon oxide-titanium oxide have been described, heretofore, in prior art. Most of these copolymers have been produced by processes leading to random entry of the silicone and the titanium oxide into the polymer molecule. Although this has resulted in many cases in products of improved utility, the excellent properties which are inherent in copolymers containing an Si-O-Ti-O repeating unit have not been realized. The prior art copolymers contain Si-O-Ti-O units as well as the polysiloxane and polytitanoxane units. The occurrence of these structures is random and unpredictable.

The random copolymers of silicone and titanoxane described in prior art disclosures have been produced by condensing soluble titanium derivatives with hydrolyzable organo-substituted silanes. These methods have resulted in either highly cross-linked products or in compositions which still contained readily hydrolyzable groups attached to the titanium. It is not possible to produce thermally stable linear copolymers or linear copolymers that are stable to hydrolytic degradation by the use of the above-described processes. Other disclosures have been made on titanoxane polymers in which the side groups attached to titanium are triorganosiloxy groups. These side groups are thermally stable yet suffer somewhat in that the triorganosiloxy groups are cleaved under certain conditions.

Accordingly, it is an important object of this invention to provide resinous organo silicon-titanium oxide copolymers of controlled structure and improved thermal stability.

Another object of this invention is to provide silicon-titanium oxide copolymers having alkyl or aryl substituents attached to silicon and chelating groups attached to titanium.

A further object of this invention is to provide a group of resinous compositions of controlled structure and molecular weight and reproducible thermal and mechanical properties.

Other objects and advantages of the invention will appear from the more detailed description set forth below, it being understood that this more detailed description is given by way of explanation and illustration only, and not by way of limitation, since various changes therein may be made by those skilled in the art without departing from the scope and spirit of the present invention.

The copolymers of the present invention can be prepared by several processes. In one method the side groups of the already formed silicon-titanium oxide copolymers are replaced with chelating agents. Thus, the copolymers of the structures:

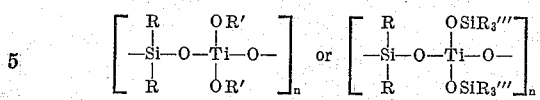

can be treated with chelating agents to form the organo silicon-chelated titanium oxide copolymers:

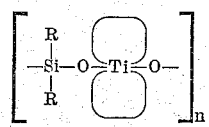

where R, R' and R''' represent organo substituents, $n$ is a number greater than unity, and ⌒ represents a chelating group such as those discussed hereinafter. An alternative, and useful, method involves the copolymerization of chelated titanium intermediates with suitable silane derivatives to give resinous compositions of unequivocal structures. The silane intermediates can be expressed by the general formula $R_nSi(OOCR'')_{4-n}$, where $n$ is the integer 1 or 2. The chelated intermediates can be represented by the following general formulas:

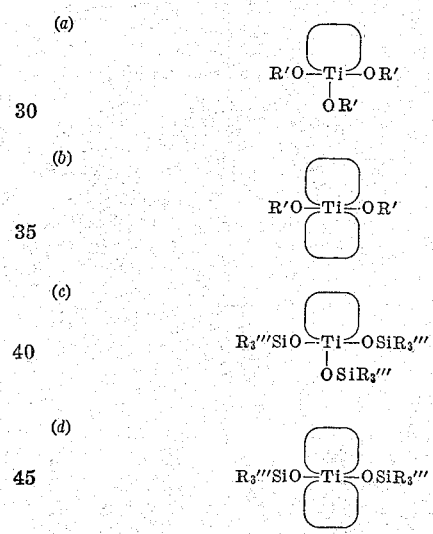

where R, R' and R''' represent an alkyl, aryl, aralkyl, or alkaryl radical. Thus, R' and R''' can be methyl, ethyl, propyl, butyl, isopropyl, sec.-butyl, and the like; or benzyl, methyl benzyl, α-phenylethyl, β-phenylethyl, α-phenylpropyl, and the like. The chelating agent can be a β-diketone such as acetylacetone, benzoylacetophenone, acetylacetophenone, propionylacetone, and the like; or a β-ketoester such as ethyl acetoacetate, propyl benzoylacetate, ethyl propionylacetate, diethyl malonate, and the like; or β-hydroxy or β-amino ketones and esters such as o-hydroxyacetophenone, o-aminoacetophenone, methyl glycinate, ethyl alanate, and the like; or compounds such as 8-hydroxyquinoline, o-hydroxybenzalimide, 1-aminoacridine, 1-hydroxyacridine, trimethylene diamine, and the like.

The ordered copolymers of silicon and titanium oxide of the present invention can be prepared by utilizing the chelated titanium intermediates as illustrated schematically in the following reactions:

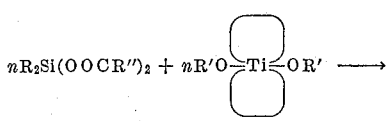

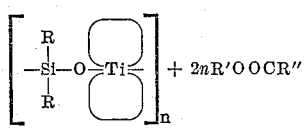

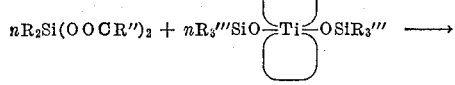

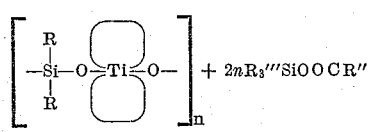

where R, R', R" and R'" represent organo radicals. Radicals R', R" and R'" can be alkyl, aralkyl, or aryl. However, these groups preferably are of low molecular weight, having preferably less than about eight carbon atoms per group. In such cases, the ester eliminated during the reaction has sufficient volatility so that it can be removed by distillation at ambient or reduced pressure. These groups can be methyl, ethyl, propyl, benzyl, phenyl and the like. These reactions have several variations which will become apparent from the more detailed description given hereinafter.

We have found that the above reaction always produces substantially regularly ordered silicon-titanium copolymers. Thus, when conducted properly as will be described in the illustrative examples, a polymer chain containing the regularly ordered repeating unit of Si-O-Ti-O is produced. Under the reaction conditions used, $R_2Si(OOCR")_2$ does not react with similar molecules to yield Si-O-Si-O units and

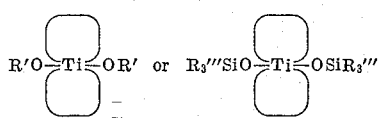

do not substantially react with similar molecules to introduce Ti-O-Ti-O units into the copolymers.

Specifically, the copolymers of the present invention can be prepared by one of several methods. When purified intermediates are used, copolymers of unequivocal structures are secured. When unpurified intermediates are employed, copolymers whose structures are the average over the postulated structures are obtained. The following reactions typify the methods of preparation with intermediates designated above as a, b, c, and d:

I

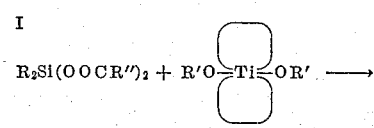

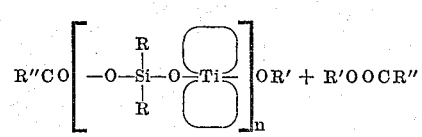

II

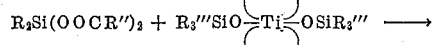

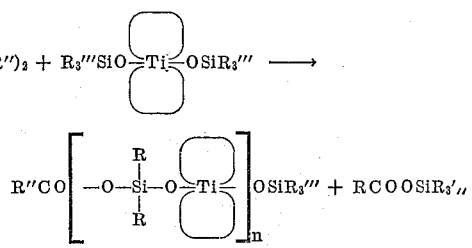

III $R_2Si(OOCR")_2 + R'O{-}Ti{\leq}OR' + R'O{-}Ti{\leq}OR'$
$\phantom{R_2Si(OOCR")_2 + R'O{-}Ti{\leq}OR' + R'O{-}Ti{\leq}}OR'$

↓

$\left[ {\geq}Ti{\leq}O{-}\underset{\underset{R}{|}}{\overset{\overset{R}{|}}{Si}}{-}O{-} \right]_m \left[ Ti{-}O{-}\underset{O-}{|} \right] \left[ \underset{\underset{R}{|}}{\overset{\overset{R}{|}}{Si}}{-}O{-}Ti{\leq}O{-} \right]_n$

↑

IV $R_2Si(OOCR")_2 + R_3'''SiO{-}Ti{\leq}OSiR_3''' + R_3'''S_2O{-}Ti{-}OSiR_3'''$
$\phantom{R_2Si(OOCR")_2 + R_3'''SiO{-}Ti{\leq}OSiR_3''' + R_3'''S_2O{-}Ti}\overset{|}{O}SiR_3'''$

V $R_2Si(OOCR")_2 + R'O{-}Ti{\leq}OR' + RSi(OOCR")_3$

↓

$\left[ {-}\underset{\underset{R}{|}}{\overset{\overset{R}{|}}{Si}}{-}O{-}Ti{\leq}O{-} \right]_m \left[ {-}\underset{\underset{R}{|}}{\overset{\overset{R}{|}}{Si}}{-}O{-} \underset{O-}{|} \right] \left[ Ti{\leq}O{-}\underset{\underset{R}{|}}{\overset{\overset{R}{|}}{Si}}{-}O \right]_n$

↑

VI $R_2Si(OOCR")_2 + R_3'''SiO{-}Ti{\leq}OSiR_3''' + RSi(OOCR")_3$ where $m$ and $n$ are numbers equal to one or more than one.

The copolymers of the present invention can be prepared with any desired molecular weight and form, depending upon the reaction conditions, stoichiometry, and character of the radical R attached to the silicon atom and the nature of the chelating groups. In general, the initial polymers of this invention have the form of:

$Y\left[ {-}\underset{\underset{R}{|}}{\overset{\overset{R}{|}}{Si}}{-}O{-}Ti{\leq}O{-} \right]_n X$ where X can be $-R', -SiR_3''', -\underset{\underset{R}{|}}{\overset{\overset{R}{|}}{Si}}{-}OOCR"$ and Y can be $R'O{-}Ti{\leq}O{-}, R_3'''SiO{-}Ti{\leq}O{-},$ or $R"COO{-}$ and where R, R', R'', and R''' can be any of the organo groups discussed above. In the above reactions I, III and V for the preparation of the polymers of this invention it is also possible to use intermediates of the form:

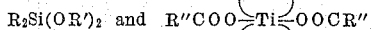

In order to produce copolymers of the present invention having the desired properties, it is desirable that the intermediates be in substantially pure form. The silane derivatives can be synthesized and purified by any suitable means well-known to those skilled in the art. The chelated titanium compounds, we have found, are preferably prepared according to the following reactions:

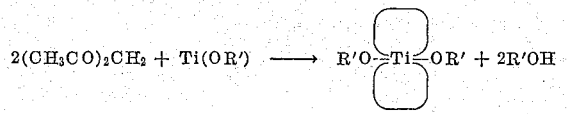

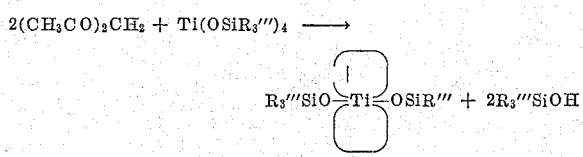

The reactions given immediately above are illustrated using acetylacetone as the chelating agent. However, any of the other chelating compounds mentioned earlier above can be used. The functionality of the chelated titanium intermediates can be controlled by the stoichiometry of the reaction. For best results, the reaction is carried out in an inert solvent such as carbon tetrachloride or cyclohexane.

The copolymers of the present invention can be polymerized further by hydrolysis of the end groups X and Y of the polymers illustrated above. A typical and possible structure for the hydrolytically polymerized materials is illustrated by the following reaction:

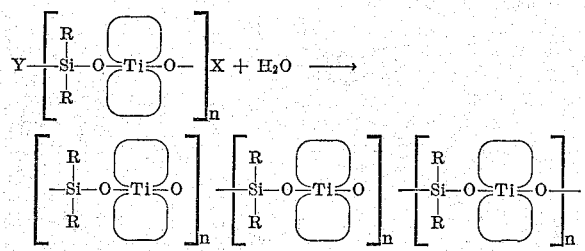

The products of this invention which contain reactive end groups can be used to great advantage to prepare modifications of a variety of resinous materials of enhanced thermal properties, mechanical strength at elevated temperatures, weathering resistance, and the like. The reactive end groups of our polymers are capable of reacting with alcohol and acid groups on resinous products such as alkyd resins, with phenolic hydroxyl groups, with esters to undergo ester interchange, with drying oil fatty acids, with silicone hydroxyl groups, with amine groups, and epoxy groups as well as many other reactive sites on other polymer molecules. By reacting with these resinous compositions, the polymers of this invention become a chemical part of the resinous composition, and thus impart desirable and unique properties to these modified compositions.

The polymers of the present invention can be used alone or in admixture with fillers and reinforcing agents, the proper choice of which depends upon the end use of the composition. As fillers there can be used glass fibers, clays, pigments, such as iron oxide, zinc oxide, aluminum oxide, titanium oxide, litharge, etc. Although the compositions of this invention can be advanced or cured by the application of heat, catalysts can be employed such as metallic salts of carboxylic acids, quaternary ammonium salts of carboxylic acids, metallic oxides, amines, organic peroxides, and the like.

The following examples are given to illustrate the materials and processes of the present invention and include illustrative procedures for the preparations of intermediates useful in the synthesis of the polymers.

Example I

To 28.4 grams of tetraisopropoxytitanium dissolved in 150 ml. of cyclohexane, 44.8 grams of benzoylacetophenone in 300 ml. of cyclohexane was added. The addition of the β-diketone caused the mixture to turn bright yellow, and a precipitation of a yellow solid was observed. This solid dissolved upon heating and refluxing was continued for 45 minutes. The yellow solid which again appeared on cooling was separated by filtration. The product, diisopropoxytitanium bis(benzoylacetophenonate), weighed 57.3 grams and melted at 172–175° C.

Example II

To 40.4 grams of tetrakis (trimethylsiloxy) titanium dissolved in 150 ml. of cyclohexane, 29.0 grams of 8-hydroxyquinoline in 300 ml. of cyclohexane was added. The reaction mixture immediately became bright yellow. Approximately ten minutes after the addition was completed a bright yellow solid precipitated out of the reaction mixture. This solid dissolved upon heating and the solution was refluxed for 20 minutes. Upon cooling to room temperature the yellow solid again precipitated. The mixture was filtered in a Buechner funnel and dried under a vacuum. The product, bis(trimethylsiloxy)titanium bis(8-quinolinolate), melted at 145–148° C. and amounted to 46.9 grams.

Example III

An equimolar amount of dimethyldiacetoxysilane was added to diisopropoxytitanium bis(acetylacetonate). The mixture was heated gently. The contents of the flask turned dark brown in color and the odor of isopropyl acetate was detected. The volatile material was removed from the reaction mixture by heating under vacuum. The residual material was a very viscous dark brown polymer, which can be further polymerized by heating in air to a hard tough polymer.

Example IV

To 22.4 grams of triisopropoxytitanium benzoylacetophenonate was added 13.2 grams of dimethyldiacetoxysilane. The mixture was heated to give an amber colored solution. Further heating caused a yellow solid to precipitate. The low boiling material was removed under vacuum. The resulting silicon oxide-titanium oxide copolymer was a yellow solid which was only partially soluble in common organic solvents.

Example V

To 28.4 grams of tetraisopropoxytitanium was added 17.6 grams of dimethyldiacetoxysilane. An exothermic reaction ensued and the odor of isopropyl acetate was detected. To this clear solution 29.0 grams of 8-hydroxyquinoline was added which turned the solution orange. The solution was then heated and the volatile material was removed under vacuum. The resulting orange colored polymer could be further polymerized by prolonged heating at high temperature.

Example VI

An equimolar quantity of dimethyldiacetoxysilane was added to bis(trimethylsiloxy)titanium bis(8-quinolinolate) of Example II. The mixture was carefully heated to complete the ester interchange with the silyl acetate. The orange-red melt turned red brown in color as the more volatile trimethylacetoxysilane was removed.

Upon cooling to room temperature, a hard film was obtained. The product, which was soluble in aromatic solvents, could be further polymerized by heating in air.

*Example VII*

To 26.9 grams of bis(trimethylsiloxy) titanium bis(benzoylacetophenonate), 7.0 grams of dimethyldiacetoxysilane was added. Careful heating of the reaction mixture formed a yellow solution which turned amber on continued heating. After the volatile material was removed, an amber colored copolymer was obtained. This product resembled the copolymer of Example VI in that it was soluble in aromatic solvents and was further polymerized by heating in air.

*Example VIII*

An equimolar quantity of dimethyldiacetoxysilane was added to diisopropoxytitanium bis(benzoylacetophenonate) of Example I. The mixture was heated to give a brown melt. A volatile material was observed to be refluxing on the walls of the reaction vessel and the odor of isopropyl acetate was detected. The organic ester was removed by heating under vacuum leaving a brown viscous polymer. This thermo-plastic copolymer dissolves readily in the common organic solvent. Prolonged heating in air at elevated temperature effected further cure and the polymer became insoluble.

What is claimed is:

1. A process for the production of an ordered organo-silicon-chelated titanium oxide polymer comprising reacting, by organic ester elimination under substantially anhydrous conditions, approximately equimolar amounts of an organo acyloxy silane having the general formula $R_nSi(OOCR')_{4-n}$ with a dialkoxy titanium dichelate having the general formula

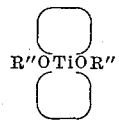

wherein R is a hydrocarbon radical of the group consisting of alkyl, aryl, aralkyl and alkaryl radicals, R' and R" are hydrocarbon alkyl radicals, n is an integer from 1 to 2 inclusive, and ⌒ is a chelate group selected from the class consisting of beta-diketones, beta-ketoesters, beta-hydroxyketones, beta-aminoketones, and beta-hydroxyamines.

2. A process for the production of an ordered organo-silicon-chelated titanium oxide polymer comprising reacting, by organic ester elimination under substantially anhydrous conditions, approximately equimolar amounts of an organo acyloxy silane having the general formula $R_nSi(OOCR')_{4-n}$ with a dialkoxy titanium dichelate having the general formula

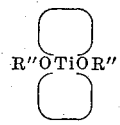

wherein R is a hydrocarbon alkyl radical of the group consisting of methyl, ethyl, propyl, butyl, amyl, and hexyl radicals, R' and R" are hydrocarbon alkyl radicals, n is an integer from 1 to 2 inclusive, and ⌒ is a chelate group selected from the class consisting of beta-diketones, beta-ketoesters, beta-hydroxyketones, beta-aminoketones, and beta-hydroxyamines.

3. A process for the production of an ordered organo-silicon-chelated titanium oxide polymer comprising reacting, by organic ester elimination under substantially anhydrous conditions, approximately equimolar amounts of an organo acyloxy silane having the general formula $R_nSi(OOCR')_{4-n}$ with a dialkoxy titanium dichelate having the general formula

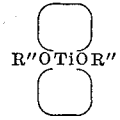

wherein R is a hydrocarbon aryl radical of the group consisting of phenyl, tolyl, xylyl, biphenylyl and naphthyl radicals, R' and R" are hydrocarbon alkyl radicals, n is an integer from 1 to 2 inclusive, and ⌒ is a chelate group selected from the class consisting of beta-diketones, beta-ketoesters, beta-hydroxyketones, beta-aminoketones, and beta-hydroxyamines.

4. A process according to claim 1, wherein R is a hydrocarbon alkyl radical.

5. A process according to claim 1, wherein R is a hydrocarbon aryl radical.

6. A process according to claim 1, wherein R is a hydrocarbon aralkyl radical.

7. A process according to claim 1, wherein R is a hydrocarbon alkaryl radical.

8. A process for the production of an ordered organo-silicon-chelated titanium oxide polymer comprising reacting, by isopropyl acetate elimination under substantially anhydrous conditions, approximately equimolar amounts of dimethyl diacetoxy silane with diisopropoxy titanium bis(acetylacetonate).

9. A process for the production of an ordered organo-silicon-chelated titanium oxide polymer comprising reacting, by isopropyl acetate elimination under substantially anhydrous conditions, approximately equimolar amounts of dimethyl diacetoxy silane with triisopropoxy titanium benzoylacetophenonate.

10. A process for the production of an ordered organo-silicon-chelated titanium oxide polymer comprising reacting, by isopropyl acetate elimination under substantially anhydrous conditions, approximately equimolar amounts of dimethyl diacetoxy silane with tetraisopropyl titanate followed by reaction with 8-hydroxyquinoline.

11. A process for the production of an ordered organo-silicon-chelated titanium oxide polymer comprising reacting, by isopropyl acetate elimination under substantially anhydrous conditions, approximately equimolar amounts of dimethyl diacetoxy silane with diisopropoxy titanium bis(benzoylacetophenonate).

References Cited in the file of this patent

UNITED STATES PATENTS

| | | |
|---|---|---|
| 2,643,262 | Bosturick | June 23, 1953 |
| 2,680,108 | Schmidt | June 1, 1954 |
| 2,716,656 | Boyd | Aug. 30, 1955 |
| 3,013,992 | Rust et al. | Dec. 19, 1961 |

FOREIGN PATENTS

| | | |
|---|---|---|
| 2,465,296 | Switzerland | Mar. 22, 1949 |